United States Patent
Anast et al.

(10) Patent No.: US 9,862,641 B2
(45) Date of Patent: Jan. 9, 2018

(54) FIBER REINFORCED CEMENTITIOUS COMPOSITION

(71) Applicant: JAMES HARDIE TECHNOLOGY LIMITED, Dublin (IE)

(72) Inventors: Maree Anast, Rosehill (AU); Xiangyuan Liu, Fontana, CA (US); Brian McQuerrey, Rancho Cucamonga, CA (US); Padmaja Parakala, Rosehill (AU); Leonard Silva, Rosehill (AU)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 15/441,179

(22) Filed: Feb. 23, 2017

(65) Prior Publication Data

US 2017/0240466 A1 Aug. 24, 2017

Related U.S. Application Data (60) Provisional application No. 62/298,950, filed on Feb. 23, 2016.

(51) Int. Cl.
| | |
|---|---|
| *C04B 14/38* | (2006.01) |
| *C04B 14/46* | (2006.01) |
| *C04B 16/02* | (2006.01) |
| *C04B 22/06* | (2006.01) |
| *C04B 18/02* | (2006.01) |
| *C04B 16/06* | (2006.01) |
| *C04B 28/02* | (2006.01) |

(52) U.S. Cl.
CPC .......... *C04B 14/4668* (2013.01); *C04B 16/02* (2013.01); *C04B 16/0633* (2013.01); *C04B 16/0641* (2013.01); *C04B 18/027* (2013.01); *C04B 22/06* (2013.01); *C04B 28/02* (2013.01)

(58) Field of Classification Search
CPC . C04B 14/4668; C04B 16/0633; C04B 16/02; C04B 16/0641; C04B 18/027; C04B 22/06; C04B 28/02
See application file for complete search history.

(56) References Cited

U.S. PATENT DOCUMENTS

| | | | |
|---|---|---|---|
| 7,765,759 B2 * | 8/2010 | Au | E04B 2/8629 52/309.12 |
| 2006/0157244 A1 * | 7/2006 | Reddy | C04B 14/38 166/292 |
| 2006/0213664 A1 * | 9/2006 | Chatterji | C04B 28/02 166/292 |
| 2012/0076969 A1 * | 3/2012 | Ponomarev | C04B 28/02 428/70 |

FOREIGN PATENT DOCUMENTS

| | | | |
|---|---|---|---|
| CN | 105272004 A | * | 1/2016 |
| DE | 20 2011 102 417 U1 | * | 9/2011 |
| JP | 2008-50213 A | * | 3/2008 |
| JP | 2008-105909 A | * | 5/2008 |
| WO | WO 2011/044604 A1 | * | 4/2011 |
| WO | WO 2014/094864 A1 | * | 6/2014 |

* cited by examiner

*Primary Examiner* — Anthony J Green
(74) *Attorney, Agent, or Firm* — Knobbe, Martens, Olson & Bear, LLP (57) ABSTRACT

Disclosed herein is a fiber reinforced cementitious composition comprising a cementitious binder and at least one synthetic inorganic reinforcing fiber type, wherein the synthetic inorganic reinforcing fiber type comprises at least one of a man-made mineral fiber type such as basalt fibers, an aluminosilicate wool fiber type or an alkaline earth silicate wool fiber type.

19 Claims, 1 Drawing Sheet

FIBER REINFORCED CEMENTITIOUS COMPOSITION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure generally relates to cementitious compositions and in particular to fiber reinforced cementitious compositions and articles.

Description of the Related Art

Any discussion of the prior art throughout the specification should in no way be considered as an admission that such prior art is widely known or forms part of the common general knowledge in the field.

Fiber reinforced compositions using glass fibers are known, however, glass fibers are generally unsuited for use in cementitious compositions due to the adverse reaction between the glass fibers and the cementitious matrix. These issues result in poor durability of glass fiber reinforced cementitious composites.

It is desirable to provide an improved fiber reinforced cementitious composition suitable for use in the manufacture of building products.

SUMMARY

Disclosed herein are fiber reinforced cementitious compositions that are suitable for use in the manufacture of building products.

In various embodiments, a fiber reinforced cementitious composition comprising basalt fibers is disclosed. In some embodiments, the basalt fibers are selected so that the dimensions and configurations of the fibers are similar to natural cellulose fibers. The basalt fibers can have an elongate configuration and uniform diameter throughout. In some embodiments, the density of the basalt fibers is selected to correspond to the density of the fillers in the composition so that the basalt fibers can replace at least some of the fillers. In some embodiments, the fillers can include both a low density filler and silica. In some other embodiments, the composition further includes alumina trihydrate and other additives. In some embodiments, the composition also includes cellulose fibers and/or polymer fibers wherein the total volume of the fibers in the composition does not exceed the critical fiber volume for a fiber reinforced composite material.

In one embodiment, the composition comprises a cementitious binder, fillers, and amorphous fibers derived from basalt comprising silicon dioxide ($SiO_2$) and aluminum oxide ($Al_2O_3$). The amorphous fibers derived from basalt can have a length of between 3 and 15 mm and a diameter between 8 and 50 µm wherein the fibers are dispersed in the cementitious binder. In some implementations, the fiber reinforced cementitious composition comprises about 0.1% to 9% by weight amorphous fibers derived from basalt. The fiber reinforced cementitious composition can also comprise cellulose fibers and/or polymer fibers. The polymer fibers can include fibers of polypropylene, or polyvinyl alcohol. In certain embodiments, the total volume of the fibers In some embodiments, the fiber reinforced cementitious composition further comprises an additive such as alumina trihydrate. In some embodiments, the fillers are silica. In some other embodiments, the fillers include a combination of silica and a lightweight density modifying filler such as cenospheres.

In some embodiments, a fiber reinforced cementitious composition comprising a cementitious binder and at least one synthetic inorganic reinforcing fiber type is disclosed. In some embodiments, the synthetic inorganic reinforcing fiber type comprises at least one of a man-made mineral fiber type, an aluminosilicate wool fiber type or an alkaline earth silicate wool fiber. In some embodiments, the synthetic inorganic fiber comprises basalt fibers. In some embodiments, the fiber reinforced composition comprises about 0.1% to 9% by weight basalt fibers. In some embodiments, the fiber reinforced composition comprises basalt fibers in the amount of about 2% to about 9% by weight.

In some embodiments, the cementitious binder of the fiber reinforced cementitious composition comprises Portland cement. In some embodiments, the cementitious binder comprises between about 20 to 45 wt % of the total fiber reinforced cementitious composition.

In some embodiments, the fiber reinforced cementitious composition further comprises at least one organic reinforcing fiber type. In some embodiments, the one or more of at least one organic reinforcing fiber type comprises between about 3 to 8 wt % of the total weight of the composition. In some embodiments, the organic reinforcing fiber type is selected from the group comprising natural fibers and polymer fibers. In some embodiments, the natural fibers comprise cellulose fibers. In some embodiments, the polymer fibers are selected from the group comprising fibers of polypropylene, or polyvinyl alcohol.

In some embodiments, the fiber reinforced cementitious further comprises one or more of at least one filler. In some embodiments, the at least one filler comprises between about 35 to 68 wt % of the total weight of the composition. In some embodiments, the at least one filler is selected from the group consisting of ground silica sand, ground silica rock, silica flour, silica fume, clays, partially dehydroxylated clays, carbonate man-made minerals, oxide man-made minerals, and aluminosilicate man-made minerals.

In some embodiments, the fiber reinforced cementitious further comprises one or more of at least one filler and at least one density modifying filler. In some embodiments, the at least one filler and at least one density modifying filler together comprise between about 35 to 68 wt % of the total weight of the composition, wherein the at least one filler comprises between about 27 to 68 wt % and the at least one density modifying filler comprises between about 0 to 8 wt % of the total weight of the composition. In other embodiments, the at least one filler comprises between about 35 to 68 wt % of the total weight of the composition and the at least one density modifying filler comprises between about 0 to 8 wt % of the total weight of the composition. In some embodiments, the at least one density modifying filler is selected from the group comprising cenospheres, synthetic microspheres, expanded man-made minerals, calcium silicate and the like. In one embodiment, the expanded man-made minerals comprise fully or partially expanded perlite, mica, vermiculite and clay.

In some embodiments, the fiber reinforced cementitious composition further comprises at least one or more additive(s). In some embodiments, the one or more additive(s) comprises between about 0 to 6 wt % of the total weight total weight of the composition. In some embodiments, the at least one or more additives comprises alumina trihydrate.

In some embodiments, the fiber reinforced cementitious composition comprises about 20 to 45% by weight cementitious binder, about 35 to 68% by weight of at least one filler, about 0.1% to 9% by weight basalt fibers, about 3 to 8% by weight cellulose fibers, about 0 to 8% by weight of at least one density modifying filler, about 0 to 6% by weight of at least one or more additive(s).

In some embodiments, a method of forming a fiber reinforced cementitious article is disclosed. In some embodiments, the method comprises: (a) mixing the cementitious binder and at least one synthetic inorganic reinforcing fiber type with sufficient water to achieve a slurry or paste; (b) forming a fiber reinforced cementitious article using paste formation techniques such as pressing or extrusion, or slurry forming techniques such as Hatschek, filter pressing or flow on and the like; and (c) curing the fiber reinforced cementitious article.

In some embodiments, the fiber reinforced cementitious article is cured by air curing, steam curing or autoclaving.

In some embodiments, the method further comprises the step of: mixing at least one filler selected from the group comprising ground silica sand, ground silica rock, silica flour, silica fume, clays, partially dehydroxylated clays, carbonate man-made minerals, oxide man-made minerals, and aluminosilicate man-made minerals at step (a).

In some embodiments, the method further comprises the step of mixing at least one at least one density modifying filler at step (a). In some embodiments, the at least one density modifying filler is selected from the group consisting of: cenospheres, synthetic microspheres, calcium silicate expanded man-made minerals. In some embodiments, the expanded man-made minerals comprise fully or partially expanded perlite, mica, vermiculite and clay.

In some embodiments, the method further comprises mixing at least one organic reinforcing fiber type at step (a). In some embodiments, the organic reinforcing fiber type comprises at least one of cellulose fibers and polymer fibers. In some embodiments, the polymer fibers comprise fibers of at least one of polypropylene, and polyvinyl alcohol.

BRIEF DESCRIPTION OF THE DRAWINGS

Embodiments of the disclosure will now be described, by way of example only, with reference to the accompanying drawings in which.

DETAILED DESCRIPTION

Figure 1:
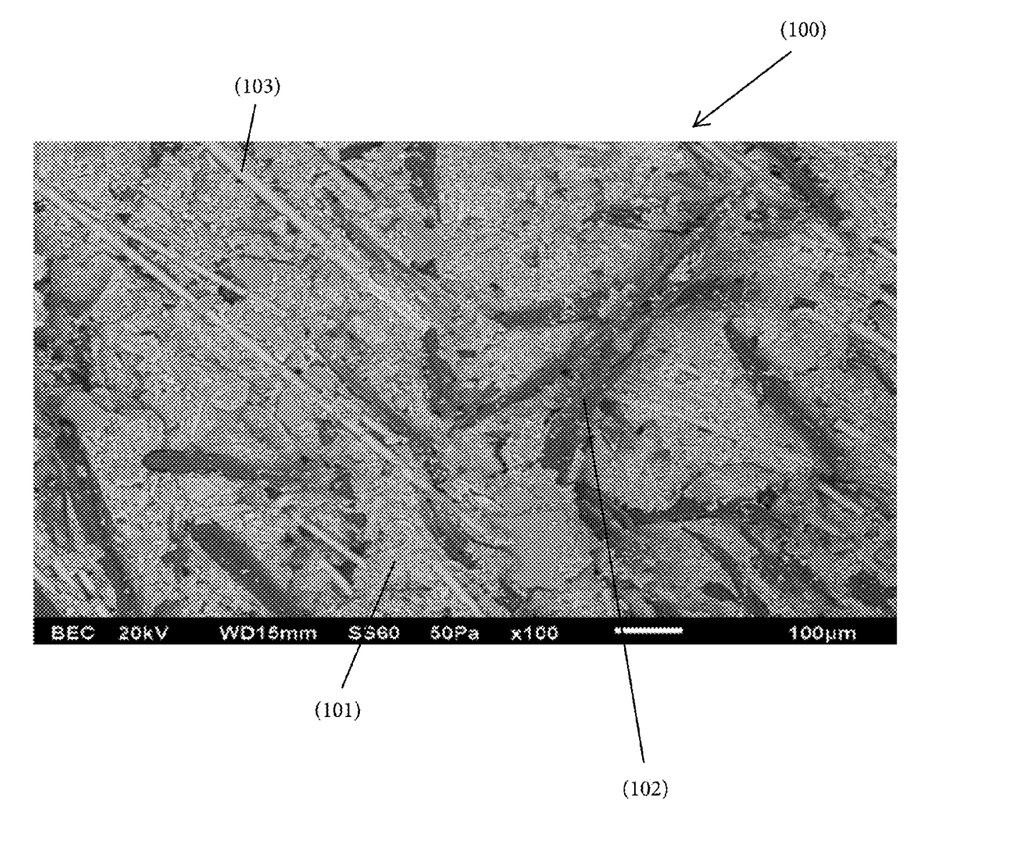
The FIGURE is an SEM image of an improved cementitious composition according to one embodiment of the disclosure, showing a mix of reinforcing fibers comprising basalt fibers and cellulose fibers.

Referring now to the FIGURE, there is shown one embodiment of an improved fiber reinforced cementitious composition (100), comprising a cementitious binder (101), at least one synthetic inorganic fiber type (102) and at least one organic fiber type (103), wherein the synthetic inorganic reinforcing fiber type (102) comprises basalt fibers. Although not shown here, in some embodiments, the at least one synthetic inorganic fiber type (102) may be the only reinforcing fiber type in the fiber reinforced cementitious composition.

In the embodiment of the FIGURE, the organic reinforcing fiber type (103) comprises one or more organic polymer fibers. Typical dimensions of the one or more organic polymer fibers suitable for use are individual fiber diameter of between about 20 to 100 µm and fiber lengths of between about 2 to 6 mm, though the dimensions can be varied. In one embodiment, the one or more organic polymer fiber comprises cellulose fibers, for example Kraft pulp and the like. Typical dimensions of the one or more cellulose fibers suitable for use are individual fiber diameters of between about 20 to 50 µm and fiber lengths of between about 2 to 7 mm, though the precise measurements may be varied to suit a particular formulation.

In the embodiment of the FIGURE, the cementitious binder (101) comprises a cement. Suitable cements include, for example, a Portland cement. Suitable cements generally have a fineness index of 250-500 $m^2/kg$. Various forms of Portland cement are suitable, depending on characteristics required in the process and a finished product made from the composition.

Cementitious composition (100) may also include at least one inorganic filler type, selected from the group comprising natural, man-made mineral or synthetic man-made minerals which may be inert or at least partially reactive with the cement to form hydrated reaction products that are amorphous or at least partially crystalline. Suitable fillers in this category are typically derived from natural or synthetic sources and includes silica, silicate minerals, aluminosilicate minerals, carbonate minerals, and the like, and mixtures thereof.

In some embodiments, the cementitious composition (100) may further comprise a density modifying filler, which may be at least partially reactive in the cementitious composition (100). Suitable density modifying fillers include, for example, one or more of the group comprising cenospheres, glass microspheres, ceramic microspheres, expanded man-made minerals, expanded polymers, or the like, and mixtures thereof.

Similarly, the cementitious composition (100) may further comprise one or more synthetic organic fibers which can provide additional durability to a cementitious composite. Suitable synthetic organic fibers include, but are not limited to, polypropylene, PVOH, PVA, and the like. Typical dimensions of the one or more synthetic organic fiber suitable for use are individual fiber widths of between about 20 to 100 µm and fiber lengths of between about 2 to 12 mm.

Cementitious composition (100) optionally further comprises additives which can improve mechanical properties or durability of a product formed from the fiber reinforced cementitious composition (100). Such additives may also be added to provide additional aesthetic or functional benefits. These additives comprise processing aids, cement set modifiers, fire retardants, pigments, dyes, rheology modifiers, pore blockers, mold inhibitors, and the like.

According to a first embodiment of the present disclosure there is provided a fiber reinforced cementitious composition comprising a cementitious binder and at least one synthetic inorganic reinforcing fiber type, wherein the synthetic inorganic reinforcing fiber type comprises at least one of a man-made mineral fiber type, an aluminosilicate wool fiber type or an alkaline earth silicate wool fiber type.

According to a second embodiment of the present disclosure there is provided a fiber reinforced cementitious material comprising a cementitious binder and at least one synthetic inorganic reinforcing fiber type, wherein the synthetic inorganic reinforcing fiber type comprises a man-made mineral fiber type.

In one embodiment, each man-made mineral fiber type substantially comprises fiber materials that are formed from molten synthetic minerals. In one embodiment, the man-made mineral fiber type comprises an amorphous fiber derived from basalt. For brevity, in certain embodiments, an amorphous fiber derived from basalt will hereinafter be referred to as basalt fiber. In one embodiment, the amorphous basalt derived fiber is present as fibers of varying lengths and diameters. Optionally, the amorphous basalt derived fiber is between about 3 and 15 mm in length and between about 8 and 50 µm in diameter. In other embodiments, the diameter of the or each amorphous basalt derived fiber is substantially uniform along the length of the or each fiber.

According to a third embodiment of the present disclosure there is provided a fiber reinforced cementitious formulation comprising a cementitious binder and basalt fibers. For example, in one implementation, the formulation can include about 0.1% to 9% by weight basalt fibers. In another implementation, the formulation can include basalt fibers in the amount of about 2% by weight, about 3% by weight, about 4% by weight, about 5% by weight, about 6% by weight, about 7% by weight, about 8% by weight, and about 9% by weight or values therein.

In some implementations, at least some of the basalt fibers have a length of between about 3 and 15 mm and a diameter of between about 8 and 50 µm.

Referring now specifically, to the embodiment shown in the FIGURE, the synthetic inorganic reinforcing fiber type (102) comprises basalt fiber. In the examples that follow, basalt fiber is present in the fiber reinforced cementitious composition in various lengths and diameters. In general, it is possible to obtain basalt fibers wherein the length of the or each basalt fiber is between about 3 and 15 mm and the diameter of the or each basalt fiber is between about 8 and 50 µm. The diameter of the or each basalt fiber may be substantially uniform along the length of the or each fiber.

It is to be understood that in the above and in each of the following examples the percentage weight values refer to the dry percentage weight of the respective components relative to the total dry weight of the composition. It is also to be understood that during formation of a fiber reinforced composition that the dry components of the composition are combined with a fluid, such as water, to obtain a slurry mix with a desired solids percentage ratio as determined by a person skilled in the art.

The present disclosure also contemplates a fiber reinforced cementitious material produced using the fiber reinforced cementitious composition, and the use of the fiber reinforced cementitious composition to produce a fiber reinforced cementitious material.

In some embodiments, each aluminosilicate wool fiber type substantially comprises aluminum and silicon oxides. In one embodiment, each alkaline earth silicate wool fiber type comprises a substantially aluminum oxide free composition of one or more alkaline earth and silicon oxides. In some embodiments, each aluminosilicate wool fiber type substantially comprises oxides of aluminum, silicon and zirconium.

In one embodiment, the aluminosilicate wool and/or alkaline earth silicate wool is present as fibers of varying lengths and diameters. Optionally, the aluminosilicate wool and/or alkaline earth silicate wool fiber can be between about 3 and 15 mm in length and between about 8 and 50 µm in diameter. In other embodiments, the diameter of each of the aluminosilicate wool and/or alkaline earth silicate wool fiber(s) can be substantially uniform along the length of each fiber.

In some embodiments, the or each basalt fiber comprises between about 49.0 and 55.5 weight percent $SiO_2$ and between about 14.0 and 18.6 weight percent $Al_2O_3$ relative to the total weight percentage of the or each basalt fiber. For instance, in some embodiments, the basalt fiber(s) may comprise about 49% $SiO_2$, 51% $SiO_2$, 53% $SiO_2$, 55.5% $SiO_2$, or any value therebetween. Similarly, in some embodiments, the or each basalt fiber may comprise about 14% $Al_2O_3$, 16% $Al_2O_3$, 18% $Al_2O_3$, 18.6% $Al_2O_3$, or any value therebetween. Accordingly, in a further embodiment, the amorphous basalt derived fibers may be classified as an aluminosilicate wool fiber type. It is of course understood that the or each amorphous basalt derived fiber may further comprise other components, for example, magnesium, iron or calcium oxides and or other components as determined by the composition of the basalt mineral used to form the amorphous basalt derived fiber.

In certain embodiments, the "synthetic inorganic fiber type" or "man-made mineral fiber type" may not include glass fibers in the form of E-glass, A-glass or ECR glass for use in the improved fiber reinforced cementitious composition.

The at least one synthetic inorganic fiber type comprising at least one of a man-made mineral fiber type or an aluminosilicate wool fiber type, such as basalt fibers, have surprising advantages over such glass fibers when combined with cementitious compositions according to certain embodiments of the disclosure despite similar chemical compositions. For instance, one surprising advantage is that basalt fibers have an about 15% higher elastic modulus and an about 25% higher tensile strength than similar chemistry glass fibers. Another advantage is that basalt fibers are more resistant to chemical attack in alkaline, acidic and salty environments than glass fibers of similar chemical composition. A further advantage is that the thermal insulation properties and high temperature resistance properties of basalt fibers are significantly better than those of E-glass fibers.

A significant and surprising property that differentiates the prior art use of glass fibers from the use of basalt fibers is that glass fibers are transparent to, and transmit, various forms of energy including infra-red, while basalt fibers, are opaque to those forms of energy and, in particular, reflect infra-red energy.

In some embodiments, the or each of the at least one synthetic inorganic reinforcing fiber type may be a discrete fiber, which may be between about 3 and 15 mm in length and between 8 and 50 µm in diameter.

Alternatively, the at least one synthetic inorganic reinforcing fiber type can be a continuous fiber, wherein the continuous fibers are greater than about 15 mm in length and are between 8 and 50 µm in diameter. For example, in one embodiment the continuous fibers are configured in the form of a strand, yarn or rope. In one embodiment, the continuous fibers are greater than about 15 mm in length and are of sufficient length or are sized so as to match the dimensions of the fiber reinforced cementitious composition or as desired by the end user. In some embodiments, the at least one synthetic inorganic reinforcing fiber type fibers can be present between 0.1 to 5 weight percent of the total weight of the fiber reinforced cementitious composition. For example, in some embodiments the at least one synthetic inorganic reinforcing fiber type fibers are present in an amount of about 0.5 wt %, 1 wt %, 2 wt %, 2.5 wt %, 5 wt %, or any value therein.

In some embodiments, the fiber reinforced cementitious composition comprises about 20 to 45% by weight cementitious binder. For instance, the fiber reinforced cementitious composition may comprise a cementitious binder in an amount of about 20 wt %, 25 wt %, 30 wt %, 35 wt %, 30 wt %, 45 wt %, or any value therein.

In some embodiments, the fiber reinforced cementitious composition comprises about 35 to 68% by weight of at least one filler. For instance, the fiber reinforced cementitious composition may comprise at least one filler in an amount of about 35 wt %, 40 wt %, 45 wt %, 50 wt %, 55 wt %, 60 wt %, 65 wt %, 68 wt %, or any value therein.

In some embodiments, the fiber reinforced cementitious composition comprises about 0.1% to 9% by weight basalt fibers. For instance, the fiber reinforced cementitious composition may comprise basalt fibers in an amount of about 0.1 wt %, 0.5 wt %, 1 wt %, 2 wt %, 4 wt %, 6 wt %, 8 wt %, 9 wt %, or any value therein.

In some embodiments, the fiber reinforced cementitious composition comprises about 3 to 8% by weight cellulose fibers. For instance, the fiber reinforced cementitious composition may comprise cellulose fibers in an amount of about 3 wt %, 4 wt %, 5 wt %, 6 wt %, 7 wt %, 8 wt %, or any value therein.

In some embodiments, the fiber reinforced cementitious composition comprises about 0 to 14% by weight of at least one or more additive(s). For instance, the fiber reinforced cementitious composition may comprise at least one or more additive(s) in an amount of about 0 wt %, 1 wt %, 2 wt %, 4 wt %, 6 wt %, 8 wt %, 10 wt %, 12 wt %, 14 wt %, or any value therein.

In one embodiment the cementitious binder of the fiber reinforced cementitious composition may comprise Portland cement. In an alternate embodiment other forms of cement may be used such as High Alumina Cements, or Sulfate Resistant Cements and the like. In one embodiment, the cementitious binder comprises between about 20 to 45 wt % of the total weight of the fiber reinforced cementitious composition. For instance, the cementitious binder of the fiber reinforced cementitious composition may be present in an amount of about 20 wt %, 22 wt %, 24 wt %, 25 wt %, 30 wt %, 35 wt %, 40 wt %, 45 wt %, or any value therein.

In another embodiment, the fiber reinforced cementitious composition further comprises one or more of at least one filler, at least one density modifying filler and/or at least one or more additive(s). In one embodiment, the one or more of at least one filler together with the at least one density modifying filler may comprise between about 35 to 68 wt % of the total weight of the composition. For instance, in some embodiments, the at least one filler together with the at least one density modifying filler may comprise about 35 wt %, 40 wt %, 45 wt %, 50 wt %, 55 wt %, 60 wt %, 65 wt %, 68 wt %, or any value therein. Similarly, the at least one or more additive(s) may comprise between about 0 to 6 wt % of the total fiber reinforced cementitious composition's weight. For instance, the at least one or more additive(s) may be present in an amount of about 0 wt %, 1 wt %, 2 wt %, 3 wt %, 4 wt %, 5 wt %, 6 wt %, or any value therein. Furthermore, the at least one density modifying filler may comprise between about 0 to 8 wt % of the total weight of the composition, such as 0 wt %, 1 wt %, 2 wt %, 3 wt %, 4 wt %, 5 wt %, 6 wt %, 7 wt %, 8 wt %, or any value therein.

In a further embodiment, the one or more of at least one filler comprises between about 27 to 68 wt % of the total weight of the composition. For instance, in some embodiments, the least one filler may comprise about 35 wt %, 40 wt %, 45 wt %, 50 wt %, 55 wt %, 60 wt %, 65 wt %, 68 wt %, or any value therein. Similarly, the at least one density modifying filler may comprise between about 0 to 8 wt % of the total weight of the composition, such as 0 wt %, 1 wt %, 2 wt %, 3 wt %, 4 wt %, 5 wt %, 6 wt %, 7 wt %, 8 wt %, or any value therein. Lastly, the at least one or more additive(s) may comprise between about 0 to 6 wt % of the total weight of the fiber reinforced cementitious formulation, such as 0 wt %, 1 wt %, 2 wt %, 3 wt %, 4 wt %, 5 wt %, 6 wt %, or any value therein.

In some embodiments the at least one filler may be selected from the group comprising ground silica sand, ground silica rock, silica flour, silica fume, clays, partially dehydroxylated clays, carbonate minerals including man-made carbonate minerals, oxide minerals including man-made oxide minerals, and aluminosilicate minerals including man-made aluminosilicate minerals. In some implementations, at least a portion of the basalt fibers can be added to replace at least a portion of the silica in the cementitious binder. In further embodiments, the at least one filler includes recycled intermediate fiber cement material derived from various stages of the manufacturing process.

In another embodiment, the at least one density modifying filler is selected from the group comprising cenospheres, synthetic microspheres, expanded minerals including expanded man-made minerals, calcium silicate and the like. In one embodiment, the expanded minerals comprise fully or partially expanded perlite, mica, vermiculite and clay.

In some implementations, the additives of the fiber reinforced cementitious composition comprises metal hydrates, such as alumina trihydrate and optionally further comprises at least one density modifying filler.

In one embodiment, the fiber reinforced cementitious composition further comprises at least one organic reinforcing fiber type. In one embodiment, the one or more of at least one organic reinforcing fiber type comprises between about 3 to 8 wt % of the total weight of the composition, such as about 3 wt %, 4 wt %, 5 wt %, 6 wt %, 7 wt %, 8 wt %, or any value therein. In one embodiment, the organic reinforcing fiber type is selected from the group comprising natural fibers and polymer fibers. In one embodiment, the natural fibers comprise cellulose fibers. In one embodiment, the polymer fibers are selected from the group comprising fibers of polypropylene, polyvinyl alcohol and the like.

In one embodiment, the fiber reinforced cementitious composition may comprise about 20 to 45% by weight cementitious binder. For example, the cementitious binder may be present in an amount of about 20 wt %, 22 wt %, 24 wt %, 25 wt %, 30 wt %, 35 wt %, 40 wt %, 45 wt %, or any value therein. The fiber reinforced cementitious composition may comprise about 35 to 68% by weight of at least one filler. For instance, in some embodiments, the least one filler may comprise about 35 wt %, 40 wt %, 45 wt %, 50 wt %, 55 wt %, 60 wt %, 65 wt %, 68 wt %, or any value therein. The fiber reinforced cementitious composition may comprise about 0.1% to 9% by weight basalt fibers, such as 0.1 wt %, 0.5 wt %, 1 wt %, 2 wt %, 4 wt %, 6 wt %, 8 wt %, 9 wt %, or any value therein. The fiber reinforced cementitious composition may comprise 3 to 8% by weight cellulose fibers, such as 3 wt %, 4 wt %, 5 wt %, 6 wt %, 7 wt %, 8 wt %, or any value therein. The fiber reinforced cementitious composition may comprise about 0 to 8% by weight of at least one density modifying filler, such as about 0 wt %, 1 wt %, 2 wt %, 3 wt %, 4 wt %, 5 wt %, 6 wt %, wt %, 8 wt %, or any value therein. The fiber reinforced cementitious composition may further comprise about 0 to 6% by weight of at least one or more additive(s), such as 0 wt %, 1 wt %, 2 wt %, 3 wt %, 4 wt %, 5 wt %, 6 wt %, or any value therein.

According to a further embodiment of present disclosure, there is provided a method of forming a fiber reinforced cementitious composition comprising the steps of: mixing the cementitious binder and at least one synthetic inorganic reinforcing fiber type with sufficient water to achieve a slurry or paste; forming a fiber reinforced cementitious article using paste formation techniques such as pressing or extrusion, or slurry forming techniques such as Hatschek, filter pressing or flow on and the like; and curing the fiber reinforced cementitious article. In one embodiment, the fiber reinforced cementitious article is cured using techniques such as air curing, steam curing or autoclaving.

In one embodiment, the method of forming a fiber reinforced cementitious composition comprises the further step of: mixing at least one filler selected from the group comprising ground silica sand, ground silica rock, silica flour, silica fume, clays, partially dehydroxylated clays, carbonate man-made minerals, oxide man-made minerals, and aluminosilicate man-made minerals at step a.

In one embodiment, the method of forming a fiber reinforced cementitious composition comprises the further step of: mixing at least one at least one density modifying filler wherein, the at least one density modifying filler is selected from the group comprising cenospheres, synthetic microspheres, calcium silicate expanded man-made minerals wherein the expanded man-made minerals comprise fully or partially expanded perlite, mica, vermiculite and clay at step a.

In one embodiment, the method of forming a fiber reinforced cementitious composition comprises the further step of: mixing at least one organic reinforcing fiber type wherein, the organic reinforcing fiber type comprises at least one of cellulose fibers and polymer fibers, wherein the polymer fibers are selected from the group comprising fibers of polypropylene, polyvinyl alcohol at step a.

EXAMPLES

In the following examples, basalt fibers (102) were selected to mimic the sizes of individualized cellulose fibers, with which they are preferably interacting to form a cementitious matrix. The cross section of the basalt fibers (102) may be predominantly circular, whilst the cross section of cellulose fibers (103) may be substantially oblate. The diameter of the or each basalt fiber (102) may advantageously be selected to be similar to the smaller dimension of the cellulose fiber geometry. This selection allows for similar behavior in slurry formation processes such as Hatschek, where composite "films" of the improved fiber reinforced cementitious composition are built up on a sieve before being transferred to a felt.

Basalt fibers or aluminosilicate wool fibers from various suppliers were trialed. Typical chemical compositions of the trialed basalt or aluminosilicate wool fibers are shown below in Table 1.

In Table 1, the other component is an optional component, present to account for minor elements and/or contaminate elements. The surface treatment component is an additional component that is optionally present on some basalt fibers or aluminosilicate wool fibers.

TABLE 1

Typical Basalt or aluminosilicate wool fiber composition

| Component | Type A (wt %) | Type B (wt %) | Type C (wt %) |
|---|---|---|---|
| $SiO_2$ | 54.5-55.5 | 49-51 | 52.7-53.7 |
| CaO | 7.5-8.5 | 7.5-8.5 | 4.3-5.3 |
| MgO | 4.0-4.6 | 6-8 | 3.2-4.2 |
| $Fe_2O_3$ + FeO | 10.0-11.5 | 9-11 | 8.7-9.7 |
| $Al_2O_3$ | 16.5-18.0 | 14-16 | 17.6-18.6 |
| $Na_2O$ + $K_2O$ | 4-5 | 3.5-7 | 6.9-7.9 |

TABLE 1-continued

Typical Basalt or aluminosilicate wool fiber composition

| Component | Type A (wt %) | Type B (wt %) | Type C (wt %) |
|---|---|---|---|
| Other | 0-3 | 0-3.5 | 0-5.6 |
| Surface treatment | 0 | 0.5-1 | 0.5-1 |

Typical chemical compositions for alkaline earth silicate wool fibers are included below in Table 2.

TABLE 2

Typical alkaline earth silicate wool fiber composition

| Component | Type D (wt %) | Type E (wt %) | Type F (wt %) |
|---|---|---|---|
| $SiO_2$ | 62-68 | 79-80 | 70-80 |
| CaO + MgO | 29-39 | | |
| MgO | | 19-20 | |
| CaO | | | 18-25 |

By way of comparison, the chemical composition of prior art glass fibers are shown in Table 3 below. Such fibers have generally been found to exhibit unsatisfactory durability when used in cementitious compositions.

TABLE 3

Typical compositions of various glass fiber types

| Component | E-Glass #1 (wt %) | E-glass #2 (wt %) | A glass | ECR Glass |
|---|---|---|---|---|
| $SiO_2$ | 52-56 | 58-60 | 71-73 | 57-59 |
| CaO | 21-23 | 21-23 | 9-11 | 21-23 |
| MgO | 0.4-4 | 2-4 | 2-4 | 1-3 |
| $Fe_2O_3$ | 0.2-0.4 | 0.2-0.6 | <0.1 | <0.1 |
| $Al_2O_3$ | 12-15 | 12-14 | <1 | 11-13 |
| $Na_2O$ + $K_2O$ | <1 | <1 | 13-15 | 1.2 |
| $ZrO_2$ | | | | |
| Other | | | <1 | |

A series of compositions are provided in Table 4. In each example the fiber reinforced cementitious composition comprises a cementitious binder and at least one synthetic inorganic fiber selected from the group comprising at least one of a man-made mineral fiber type, an aluminosilicate wool fiber type or an alkaline earth silicate wool fiber type.

The fiber reinforced cementitious composition, further comprises at least one filler and an organic fiber type. In each example, the cementitious binder is cement, the filler is silica from natural or synthetic sources, for example, milled silica and the organic polymeric fiber type is cellulose fibers. In all examples, the cellulose fibers are about 50 μm long and 20 μm in diameter. In example 4 the fiber reinforced cementitious composition, further comprises a density modifying filler. Each example optionally further comprises additives.

TABLE 4

Fiber Reinforced Cementitious Composition

| Materials | Example (a) | Example (b) | Example (c) | Example (d) | Example (e) |
|---|---|---|---|---|---|
| Cement wt % | 20-50 | 20-50 | 20-50 | 35-45 | 32-36 |
| Filler wt % | 35-60 | 35-60 | 35-60 | 30-40 | 48-52 |

TABLE 4-continued

Fiber Reinforced Cementitious Composition

| Materials | Example (a) | Example (b) | Example (c) | Example (d) | Example (e) |
|---|---|---|---|---|---|
| Density Modifying Filler wt % | 0 | 0 | 0 | 5-10 | 0 |
| Synthetic Inorganic Fiber wt % | 1-10 | 1-10 | 1-10 | 1-10 | 1-5 |
| Organic Fiber Type wt % | 3-10 | 3-10 | 3-10 | 3-10 | 6-10 |
| Additives wt % | 0-10 | 0-10 | 0-10 | 0-10 | 0-8 |

Example (a)

In example (a), the synthetic inorganic reinforcing fibers are 6 mm long chopped basalt fibers. These basalt fibers are Type B basalt fibers from Table 1. The individual fibers have diameters between 10-50 μm. The fibers have been treated with a proprietary silane surface treatment by the manufacturer. The FIGURE shows an SEM image of an improved fiber reinforced cementitious composition according to the formulation of example (a).

Example (b)

In example (b), the synthetic inorganic reinforcing fibers are Type A basalt fibers from Table 1. The basalt fibers are in the form of 6 mm chopped fibers, with an individual fiber diameter of 10-50 μm. These fibers have no additional surface treatment.

Example (c)

In example (c), the synthetic inorganic fibers are Type B basalt fibers from Table 1. The basalt fibers are in the form of 12 mm chopped fibers, with an individual fiber diameter of 10-50 μm. These fibers have the same surface treatment as per example (a).

Example (d)

In example (d), the synthetic inorganic reinforcing fibers are Type B aluminosilicate wool fibers in the form of 6 mm chopped fibers, with an individual fiber diameter of 10-50 μm. In example (d), the formulation also includes a density modifying filler in the form of expanded man-made mineral, such as expanded perlite. These fibers have the same surface treatment as per example (a).

Example (e)

In example (e), the synthetic inorganic fibers are Type C aluminosilicate wool fibers in the form of 6 mm chopped fibers, with an individual fiber diameter of 9-12 μm. These fibers have the same surface treatment as per example (a).
Control A control formulation was prepared to correspond with each of example formulations (a) to (e). The control formulation was identical in all respects to the corresponding example formulation except that the quantity of filler was increased and there were no synthetic inorganic fibers present in the control formulation. The wt % increase of filler in the control formulation corresponded to the wt % of synthetic inorganic fibers in the corresponding example formulation. Each control formulation was run under the same forming and curing conditions for comparison purposes.

In each of the above examples (a) to (e) and the corresponding controls, the dry ingredients were mixed with sufficient water to make a workable slurry with 25-30% solids. The slurry was mixed until homogeneous and formed into a rectangular board 8 mm-10 mm thick, using a filter press. The press was operated at 4.8 MPa (696 psi) for 1-2 minutes to consolidate the slurry into the rectangular board.

The "green", uncured, board was allowed to sit at ambient conditions for 12 hours and was then autoclaved for 14-20 hours at 160-200° C. to complete the curing process. Ambient curing or steam curing can be used as an alternative to autoclave curing if desirable.

Tests were carried out to determine the Physical and Mechanical properties in the form of the density and strength of each of the example formulations above. The results of the tests are shown in Table 5 below.

TABLE 5

Physical and Mechanical Properties

| | Example (a) | Example (b) | Example (c) | Example (d) | Example (e) |
|---|---|---|---|---|---|
| Density (gm/cm$^3$) | 1.2 | 1.2 | 1.2 | 1.2 | 1.3 |
| Strength (MPa) | 10.0 | 9.3 | 10.5 | 9.3 | 7.4 |

For control samples (a) to (d) made using the same cementitious binder composition as the series of example formulations, but using cellulose fiber as the only reinforcing fiber, and the same processing and curing conditions, the average strength achieved was 7.8 MPa at a density of 1.2 gm/cm$^3$.

For control sample (e) made using the same cementitious binder composition as the series of example formulations, but using cellulose fiber as the only reinforcing fiber, and the same processing and curing conditions, the strength achieved was average 8.2 MPa at a density of 1.3 gm/cm$^3$.

Examples (f) to (j) and (f') to (j')

A further series of exemplary compositions are provided in Table 6 below. In the examples of Table 6, the fiber reinforced cementitious composition comprises a cementitious binder, together with a filler, an additive, an organic polymeric fiber type and at least one synthetic inorganic fiber selected from the group comprising at least one of a man-made mineral fiber type, an aluminosilicate wool fiber type or an alkaline earth silicate wool fiber type.

In the examples of Table 6, the cementitious binder is cement, the filler is silica from natural or synthetic sources, for example, milled silica, the additive is a metal hydroxide as alumina trihydrate, the organic polymeric fiber type is cellulose fibers and in some examples there is further included a density modifying filler in the form of a low density additive. In all examples, the cellulose fibers are about 6 mm or 12 mm long and 20 μm in diameter, though these dimensions may be altered to suit a particular formulation or use.

Examples (f) to (j)

In each of examples (f) to (j), the formulations comprises three differing groups of samples. In each group the % wt of each of the components is the same. However in group 1 of the particular example, the synthetic inorganic reinforcing fibers are 6 mm long chopped Type B basalt fibers from Table 1. In group 2 of the particular example, the synthetic inorganic reinforcing fibers are 12 mm long chopped Type B basalt fibers from Table 1. The third group comprises synthetic inorganic reinforcing fibers which are 6 mm long chopped Type A basalt fibers from Table 1. The individual fibers have diameters between 10-50 µm. The fibers have been treated with a proprietary silane surface treatment by the manufacturer.

TABLE 6

Fiber Reinforced Cementitious Composition

| Materials | Example (f) | Example (g) | Example (h) | Example (i) | Example (j) |
|---|---|---|---|---|---|
| Cement wt % | 23 | 23 | 25 | 34 | 34 |
| Filler wt % | 67 | 64 | 65 | 56 | 53 |
| Additives wt % | 3 | 3 | 3 | 3 | 3 |
| Synthetic Inorganic Fiber wt % | 4 | 7 | 4 | 4 | 3 |
| Organic Fiber Type wt % | 3 | 3 | 3 | 3 | 7 |

Examples (f') to (j')

Each of examples (f') to (j') presented in Table 7 below substantially correspond to the formulations of examples (f) to (j) of Table 6, however the formulations of examples (f') to (j') comprise synthetic inorganic reinforcing fibers which are 6 mm long chopped Type B basalt fibers from Table 1 and also a low density additive component. In each of the formulations (f') to (j') the filler component is reduced to allow for the additional low density additive components. The individual fibers have diameters between 10-50 µm. The fibers have been treated with a proprietary silane surface treatment by the manufacturer.

TABLE 7

Fiber Reinforced Cementitious Composition

| Materials | Example (f') | Example (g') | Example (h') | Example (I') | Example (j') |
|---|---|---|---|---|---|
| Cement wt % | 23 | 23 | 25 | 34 | 34 |
| Filler wt % | 62 | 60 | 60 | 51 | 48 |
| Additives wt % | 3 | 3 | 3 | 3 | 3 |
| Synthetic Inorganic Fiber wt % | 4 | 6 | 4 | 4 | 3 |
| Organic Fiber Type wt % | 3 | 3 | 3 | 3 | 7 |
| Density Modifying Filler wt % | 5 | 5 | 5 | 5 | 5 |

In each of the above examples, the dry ingredients were mixed with sufficient water to make a workable slurry with 25-30% solids. The slurry was mixed until homogeneous and formed into a rectangular board 8-10 mm thick, using a filter press. The press was operated at 4.8 MPa (696 psi) for 1-2 minutes to consolidate the slurry into the rectangular board.

The "green", uncured, board was allowed to sit at ambient conditions for 12 hours and was then autoclaved for 14-20 hours at 160-200° C. to complete the curing process. Alternate curing techniques, such as air curing or steam curing can also be used.

Examples (k) to (z)

In examples (k) to (z) as presented in Tables 8 to 11 below, each fiber reinforced cementitious composition comprises a cementitious binder, together with a plurality of fillers, an additive, an organic polymeric fiber type and at least one synthetic inorganic fiber selected from the group comprising at least one of a man-made mineral fiber type, an aluminosilicate wool fiber type or an alkaline earth silicate wool fiber type.

In each of examples (k) to (z), the cementitious binder is cement, filler 1 is silica from natural or synthetic sources, for example, milled silica, filler 2 is an expanded mineral and filler 3 is recycled intermediate fiber cement material. The additive is a metal hydroxide in the form of alumina trihydrate, the organic polymeric fiber type is cellulose fibers and in some examples there is further included a density modifying filler in the form of a low density additive. In all examples, the cellulose fibers are about 6 mm or 12 mm long and 20 µm in diameter.

TABLE 8

Fiber Reinforced Cementitious Composition

| Materials | Example (k) | Example (l) | Example (m) | Example (n) |
|---|---|---|---|---|
| Cement wt % | 23 | 23 | 23 | 23 |
| Filler 1 wt % | 57 | 57 | 57 | 57 |
| Filler 2 wt % | 0 | 0 | 0 | 5 |
| Filler 3 wt % | 8 | 8 | 8 | 8 |
| Additives wt % | 3 | 3 | 3 | 3 |
| Synthetic Inorganic Fiber wt % | 7 | 7 | 7 | 7 |
| Organic Fiber Type wt % | 3 | 3 | 3 | 3 |

TABLE 9

Fiber Reinforced Cementitious Composition

| Materials | Example (o) | Example (p) | Example (q) | Example (r) |
|---|---|---|---|---|
| Cement wt % | 25 | 25 | 25 | 25 |
| Filler 1 wt % | 58 | 58 | 58 | 52 |
| Filler 2 wt % | 0 | 0 | 0 | 5 |
| Filler 3 wt % | 8 | 8 | 8 | 8 |
| Additives wt % | 3 | 3 | 3 | 3 |
| Synthetic Inorganic Fiber wt % | 4 | 4 | 4 | 4 |
| Organic Fiber Type wt % | 3 | 3 | 3 | 3 |

TABLE 10

Fiber Reinforced Cementitious Composition

| Materials | Example (s) | Example (t) | Example (u) | Example (v) |
|---|---|---|---|---|
| Cement wt % | 34 | 34 | 34 | 34 |
| Filler 1 wt % | 48 | 48 | 48 | 43 |
| Filler 2 wt % | 0 | 0 | 0 | 5 |
| Filler 3 wt % | 8 | 8 | 8 | 8 |

TABLE 10-continued

Fiber Reinforced Cementitious Composition

| Materials | Example (s) | Example (t) | Example (u) | Example (v) |
|---|---|---|---|---|
| Additives wt % | 3 | 3 | 3 | 3 |
| Synthetic Inorganic Fiber wt % | 4 | 4 | 4 | 4 |
| Organic Fiber Type wt % | 3 | 3 | 3 | 3 |

TABLE 11

Fiber Reinforced Cementitious Compositions

| Materials | Example (w) | Example (x) | Example (y) | Example (z) |
|---|---|---|---|---|
| Cement wt % | 34 | 34 | 34 | 34 |
| Filler 1 wt % | 45 | 45 | 45 | 40 |
| Filler 2 wt % | 0 | 0 | 0 | 5 |
| Filler 3 wt % | 8.00 | 8.00 | 8.00 | 8.00 |
| Additives wt % | 3.00 | 3.00 | 3.00 | 3.00 |

TABLE 11-continued

Fiber Reinforced Cementitious Compositions

| Materials | Example (w) | Example (x) | Example (y) | Example (z) |
|---|---|---|---|---|
| Synthetic Inorganic Fiber wt % | 6.65 | 6.65 | 6.65 | 6.65 |
| Organic Fiber Type wt % | 3 | 3 | 3 | 3 |

Examples (k), (o), (s), (w)

In examples (k), (o), (s), (w), the synthetic inorganic reinforcing fibers are 6 mm long chopped basalt fibers. These basalt fibers are Type B basalt fibers from Table 1. The individual fibers have diameters between 10-50 μm. The fibers have been treated with a proprietary silane surface treatment by the manufacturer.

Examples (l), (p), (t), (x)

In examples (l), (p), (t), (x), the synthetic inorganic reinforcing fibers are Type A basalt fibers from Table 1. The basalt fibers are in the form of 6 mm chopped fibers, with an individual fiber diameter of 10-50 μm. These fibers have no additional surface treatment.

Examples (m), (q), (u), (y)

In examples (m), (q), (u), (y), the synthetic inorganic fibers are Type B basalt fibers from Table 1. The basalt fibers are in the form of 12 mm chopped fibers, with an individual fiber diameter of 10-50 μm. These fibers have the same surface treatment as per example (a).

Examples (n), (r) (v), (z)

In examples (n), (r) (v), (z), the synthetic inorganic reinforcing fibers are Type B aluminosilicate wool fibers in the form of 6 mm chopped fibers, with an individual fiber diameter of 10-50 μm. In example (n), the formulation also includes a density modifying filler in the form of expanded man-made mineral, such as expanded perlite.

Tests were carried out to determine the Physical and Mechanical properties in the form of the density and strength of each of the example formulations (k) to (z) above. The results of the tests are shown in Table 12 below.

TABLE 12

Physical and Mechanical Properties

| | Example (k) | Example (l) | Example (m) | Example (n) | Example (o) | Example (p) | Example (q) | Example (r) |
|---|---|---|---|---|---|---|---|---|
| Density (gm/cm$^3$) | 1.21 | 1.2 | 1.2 | 1.19 | 1.2 | 1.2 | 1.2 | 1.2 |
| Strength (MPa) | 12.0 | 11.7 | 12.4 | 11.9 | 12.3 | 11.3 | 13.0 | 11.8 |

| | Example (s) | Example (t) | Example (u) | Example (v) | Example (w) | Example (x) | Example (y) | Example (z) |
|---|---|---|---|---|---|---|---|---|
| Density (gm/cm$^3$) | 1.3 | 1.3 | 1.31 | 1.29 | 1.29 | 1.29 | 1.29 | 1.27 |
| Strength (MPa) | 14.4 | 14.1 | 14.4 | 14.0 | 14.1 | 14.0 | 14.1 | 14.0 |

A further series of compositions are provided in Table 13 below.

Examples (aa) to (pp)

In examples (aa) to (jj) and (oo) to (pp), the fiber reinforced cementitious composition comprises a cementitious binder, at least one filler, at least one additive, an organic fiber type and at least one synthetic inorganic fiber selected from the group comprising at least one of a man-made mineral fiber type, an aluminosilicate wool fiber type or an alkaline earth silicate wool fiber type.

In examples (kk) to (nn), the fiber reinforced cementitious composition comprises a cementitious binder, at least one filler, an organic fiber type and at least one synthetic inorganic fiber selected from the group comprising at least one of a man-made mineral fiber type, an aluminosilicate wool fiber type or an alkaline earth silicate wool fiber type.

In all examples, the cementitious binder is cement, the filler is silica from natural or synthetic sources, for example, milled silica and the organic polymeric fiber type is cellulose fibers. In all examples, the cellulose fibers are about 50 μm long and 20 μm in diameter. In examples (mm) and (nn), the fiber reinforced cementitious composition, further comprises a density modifying filler.

TABLE 13

Fiber Reinforced Cementitious Compositions

| Materials | Example (aa) | Example (bb) | Example (cc) | Example (dd) | Example (ee) | Example (ff) |
|---|---|---|---|---|---|---|
| Cement wt % | 30 | 30 | 34 | 34 | 34 | 34 |
| Filler wt % | 53 | 51 | 53 | 52 | 51 | 51 |
| Synthetic Inorganic Fiber wt % | 7 | 9 | 3 | 4 | 5 | 4 |
| Organic Fiber Type wt % | 4 | 4 | 6.65 | 6.65 | 6.65 | 6.65 |
| Additives wt % | 6 | 6 | 3 | 3 | 3 | 4 |

| Materials | Example (gg) | Example (hh) | Example (ii) | Example (jj) | Example (kk) | Example (ll) |
|---|---|---|---|---|---|---|
| Cement wt % | 34 | 34 | 34 | 34 | 38.2 | 38.2 |
| Filler wt % | 50 | 50 | 50 | 50 | 47 | 46 |
| Synthetic Inorganic Fiber wt % | 5 | 4 | 5 | 4 | 4 | 5 |
| Organic Fiber Type wt % | 7 | 8 | 8 | 8 | 7 | 7 |
| Additives wt % | 4 | 3 | 3 | 4 | | |

| Materials | Example (mm) | Example (nn) | Example (oo) | Example (pp) |
|---|---|---|---|---|
| Cement wt % | 38 | 38 | 40 | 40 |
| Filler wt % | 43 | 42 | 44 | 41 |
| Density Modifying Filler wt % | 7 | 8 | | |
| Synthetic Inorganic Fiber wt % | 7 | 7 | 7 | 9 |
| Organic Fiber Type wt % | 5 | 5 | 4 | 4 |
| Additives wt % | | | 6 | 6 |

Tests were carried out to determine the Physical and Mechanical properties in the form of the density and strength of each of the example formulations (aa) to (pp) above.

The results of the tests are shown in Table 14 below.

TABLE 14

Physical and Mechanical Properties

| | Example (aa) | Example (bb) | Example (cc) | Example (dd) | Example (ee) | Example (ff) | Example (gg) | Example (hh) |
|---|---|---|---|---|---|---|---|---|
| Density (gm/cm$^3$) | 1.5 | 1.5 | 1.5 | 1.5 | 1.5 | 1.5 | 1.5 | 1.5 |
| Strength (MPa) | 16.0 | 17.0 | 14.2 | 14.8 | 15.1 | 14.1 | 14.2 | 14.0 |

| | Example (ii) | Example (jj) | Example (kk) | Example (ll) | Example (mm) | Example (nn) | Example (oo) | Example (pp) |
|---|---|---|---|---|---|---|---|---|
| Density (gm/cm$^3$) | 1.5 | 1.5 | 1.5 | 1.6 | 1.5 | 1.6 | 1.6 | 1.6 |
| Strength (MPa) | 14.0 | 14.0 | 15.0 | 15.2 | 15.0 | 15.9 | 17.0 | 17.4 |

As shown in Table 14, the improved fiber reinforced cementitious composition disclosed herein enables the production of building products having enhanced mechanical properties. As discussed above, basalt fibers have surprising advantages over glass fibers despite similar chemical compositions. For instance, basalt fibers have an about 15% higher elastic modulus and about 25% higher tensile strength than similar glass fibers. Advantageously, the enhanced properties of basalt fibers are preserved in the resultant fiber cement sheet. For instance, when compared to traditional fiber reinforced cementitious composites, which utilize cellulose fiber as the sole reinforcing fiber, the improved fiber reinforced cementitious composition exhibits measurably improved strength, while both thickness and density were reduced.

While several components, techniques and aspects have been described with a certain degree of particularity, it is manifest that many changes can be made in the specific designs, constructions and methodology herein above described without departing from the spirit and scope of this disclosure.

In certain embodiments, it is more important that the combined weight percent (and hence combined volume fraction) of reinforcing fiber in each formulation is above the critical fiber volume for a fiber reinforced composite material.

The fiber volume of a composite material can be calculated according to Equation 1 below:

$$Vf = \frac{\rho m * Wf}{\rho m * Wf + \rho f * Wm} \quad \text{Equation 1}$$

Where $V_f$ is the volume fraction of reinforcing fibers, $W_f$ is the weight of the fibers, $W_m$ is the weight of matrix, $\rho_f$ is the density of the fibers and $\rho_m$ is the density of the matrix.

The general definition of the critical fiber volume in a fiber reinforced composite is that it is the Volume fraction of fiber at which the fiber continues to carry the same load after the brittle matrix has cracked as the composite carried prior to cracking.

Certain features that are described in this disclosure in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "about," "generally," and "substantially" as used herein represent a value, amount, or characteristic close to the stated value, amount, or characteristic that still performs a desired function or achieves a desired result.

Some embodiments have been described in connection with the accompanying drawings. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A fiber reinforced cementitious composition comprising:
   a cementitious binder;
   about 0.1% to 9% by weight amorphous fibers derived from basalt comprising silicon dioxide ($SiO_2$) and aluminum oxide ($Al_2O_3$), wherein the amorphous fibers derived from basalt have a length between 3 and 15 mm and a diameter between 8 and 50 μm;
   at least one filler;
   about 0.1 to 8% by weight organic reinforcing fibers;
   wherein the amorphous fibers derived from the basalt are dispersed in the cementitious binder.

2. The fiber reinforced cementitious composition of claim 1, wherein the organic reinforcing fibers comprise cellulose fibers.

3. The fiber reinforced cementitious composition of claim 1, further comprising alumina trihydrate.

4. The fiber reinforced cementitious composition of claim 1, wherein the fillers comprise a density modifying filler.

5. The fiber reinforced cementitious composition of claim 1, wherein the fillers are selected from the group consisting of ground silica sand, ground silica rock, silica flour, silica fume, clays, partially dehydroxylated clays, carbonate man-made minerals, oxide man-made minerals, and aluminosilicate man-made minerals.

6. The fiber reinforced cementitious composition of claim 1, wherein the fiber reinforced cementitious composition further comprises polymer fibers.

7. The fiber reinforced cementitious composition of claim 6, wherein the polymer fibers are selected from the group consisting of fibers of polypropylene, and polyvinyl alcohol.

8. A fiber reinforced cementitious composition comprising about 20 to 45% by weight cementitious binder, about 35 to 68% by weight of at least one filler, about 0.1% to 9% by weight basalt fibers, about 3 to 8% by weight cellulose fibers, about 0 to 8% by weight of at least one density modifying filler, about 0 to 6% by weight of at least one or more additive(s).

9. The fiber reinforced cementitious composition of claim 8, wherein the fiber reinforced cementitious composition further comprises polymer fibers.

10. The fiber reinforced cementitious composition of claim 9, wherein the polymer fibers are selected from the group consisting of fibers of polypropylene, or polyvinyl alcohol.

11. The fiber reinforced cementitious composition of claim 10, wherein the polymer fibers have a diameter of about 20 to 100 μm.

12. The fiber reinforced cementitious composition of claim 8, wherein the amorphous fibers derived from basalt have a length between 3 and 15 mm, and a diameter between 8 and 50 μm.

13. The fiber reinforced cementitious composition of claim 8, wherein the at least one filler is at least partially reactive with the cementitious binder.

14. The fiber reinforced cementitious composition of claim 8, wherein the at least one density modifying filler is at least partially reactive with the cementitious binder.

15. The fiber reinforced cementitious composition of claim 8, wherein the at least one density modifying filler is selected from the group consisting of: cenospheres, synthetic microspheres, calcium silicate, fully expanded perlite, partially expanded perlite, mica, vermiculite, clay, and combinations thereof.

16. The fiber reinforced cementitious composition of claim 8, wherein the at least one additive(s) comprise alumina trihydrate.

17. The fiber reinforced cementitious composition of claim 8, wherein the cementitious binder comprises Portland cement.

18. The fiber reinforced cementitious composition of claim 8, wherein the cellulose fibers have a diameter between about 20 to 50 μm.

19. The fiber reinforced cementitious composition of claim 8, wherein the cellulose fibers have a length between about 2 and 7 mm.

\* \* \* \* \*